(12) United States Patent
Persson

(10) Patent No.: US 8,320,062 B1
(45) Date of Patent: Nov. 27, 2012

(54) LOCKABLE EYEPIECE HOLDER

(76) Inventor: J. Roger Persson, Hindas (SE)

( * ) Notice: Subject to any disclaimer, the term of this patent is extended or adjusted under 35 U.S.C. 154(b) by 118 days.

(21) Appl. No.: 13/081,244

(22) Filed: Apr. 6, 2011

(51) Int. Cl.
*G02B 7/02* (2006.01)

(52) U.S. Cl. ...................................... 359/819; 359/811

(58) Field of Classification Search .................. 359/811, 359/819, 821–823
See application file for complete search history.

(56) References Cited

U.S. PATENT DOCUMENTS

| | | |
|---|---|---|
| 732,089 A | 6/1903 | Lenzen |
| 929,464 A | 7/1909 | McGinnis |
| 2,979,210 A | 4/1961 | Patterson |
| 3,154,209 A | 10/1964 | Wilhite |
| 4,494,667 A | 1/1985 | Griffith |
| 5,878,882 A | 3/1999 | Kohagura |
| 6,132,684 A | 10/2000 | Marino |
| 6,543,614 B2 | 4/2003 | Nii |
| 2008/0273255 A1* | 11/2008 | Yang et al. ................... 359/819 |

* cited by examiner

*Primary Examiner* — Alicia M Harrington
(74) *Attorney, Agent, or Firm* — QuickPatents, Inc.; Kevin Prince

(57) ABSTRACT

A holder for at least one eyepiece is described. The holder includes an upper plate having at least two upper apertures therethrough, a top surface, and a bottom surface, and a lower plate having at least two lower apertures therethrough, a top surface, and a bottom surface. Each lower aperture corresponds to one of the upper apertures of the upper plate. When the upper and lower plates are mutually aligned, the at least one eyepiece may be inserted through corresponding upper and lower apertures. Furthermore, when one of the plates is selectively slid with respect to the other plate, the upper and lower apertures become misaligned to bind the at least one eyepiece to retain the eyepiece in the holder.

7 Claims, 3 Drawing Sheets

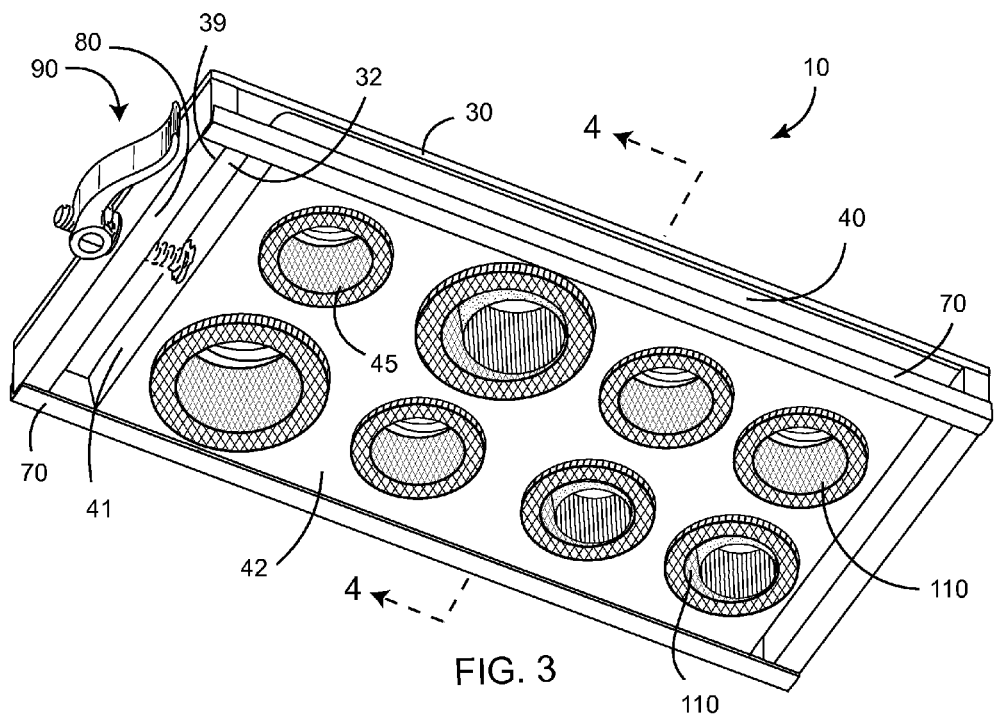
FIG. 3
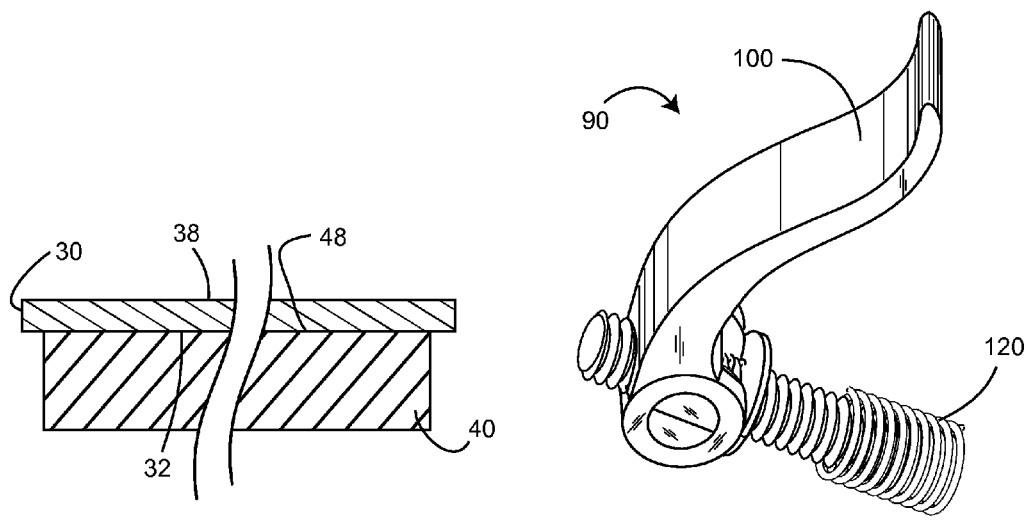
FIG. 4
FIG. 5

LOCKABLE EYEPIECE HOLDER

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to holders, and more particularly to a holder for eyepieces.

DISCUSSION OF RELATED ART

An eyepiece, also known as an ocular lens, is generally a lens that is closest to the eye of the user when using optical devices, such as telescopes, microscopes, and binoculars, for example. The eyepiece may conventionally be used to magnify an image received from other lenses in the optical device, and a user may have multiple interchangeable eyepieces for use with the optical device. By switching eyepieces, the user can adjust what is viewed. For instance, eyepieces may often be interchanged to increase or decrease the magnification of a telescope. Eyepieces may also offer varying fields of view, and affect the eye relief, or distance the eye of the user must be to use the eyepiece, of the optical device. Herein the term "eyepiece" shall refer to any ocular lens, magnifier, adapter, collimator device, Barlow lens, or other accessory or part that is interchangeable when used with a microscope, telescope, camera, or the like.

To facilitate use of multiple eyepieces, eyepiece holders that secure multiple eyepieces may be used. Conventional eyepiece holders generally secure multiple eyepieces, usually by locking the eyepieces one-by-one in a housing (e.g., using lock screws). Requiring that each eyepiece be locked individually may be disadvantageous because locking and unlocking each eyepiece may be cumbersome and time-consuming when the user wishes to adjust the eyepieces in the eyepiece holder or replace one or more eyepieces.

While devices for securing multiple objects are known, these devices are seemingly ill-suited for adaptation to optical eyepieces. For example, U.S. Pat. No. 929,464 to McGinnis filed on Sep. 30, 1908 ("McGinnis") describes a dipping device for jars or bottles that includes two plates that each have a series of openings. The device holds the jars by inserting the jars when the openings of the two plates are aligned, and then shifting the plates so that they are unaligned with each other. However, in McGinnis the openings in each of the two plates are shown to be substantially the same size, making them unsuitable for eyepieces, which may have varying widths at each end of the eyepiece. Because one end of the eyepiece may be smaller than the other end, the smaller end may be free to move while the larger end is secured, thereby risking damage to the smaller end. U.S. Pat. No. 2,979,210 to Patterson filed on Apr. 19, 1960, which describes a test tube rack, and U.S. Pat. No. 6,132,684 to Marino filed on Oct. 31, 1997, describing a sample tube holder, are similarly ill-suited for use with eyepieces. Such holders have the further disadvantage of having a gap between the two plates, which can lead to less protection from external elements and less stability overall.

Another example of a holder that may not be suited for eyepieces is described in U.S. Pat. No. 5,878,882 to Kohagura filed on Sep. 10, 1997 ("Kohagura"). Kohagura describes a tool box that has a first surface and a second surface, each having apertures, where the first surface is placed above the second surface. Tools such as drill bits, may be inserted through a first aperture in the first surface and through a second apertures in the second surface when the first aperture and the second aperture are aligned. The positions of the first surface and the second surface may then be altered such that the tools are not allowed to translate along the longitudinal axes of the tools, thereby seemingly holding the tools in place. The tool box described in Kohagura does not seem to be suited for eyepieces however because the tools shown seem to be held in place by the edges of the proximal ends of the second apertures. See Kohagura, FIGS. 4A-4B. Holding eyepieces in such a manner may be unsuitable because the force applied by the edges of the proximal ends may cause damage to the eyepieces. Also, the tool box described in Kohagura would seemingly fail to provide any additional protection from damage to the eyepieces (e.g., by scratching against the toolbox interior surface) other than by holding the eyepieces in place.

Therefore, there is a need for an eyepiece holder that may secure multiple eyepieces as a group, instead of requiring that each eyepiece be secured individually. Such an eyepiece holder would account for eyepieces with ends having different widths. Such an eyepiece holder would also account for the relatively delicate nature of the eyepieces by providing protection to the eyepieces from scratching, for example, by coming into contact with exterior surfaces. The present invention accomplishes these objectives.

SUMMARY OF THE INVENTION

The present device is a holder for at least one eyepiece, such as an optical, electrical or other type of eyepiece for an instrument, such as a telescope, microscope, or the like. The holder includes an upper plate having at least two upper apertures therethrough, a top surface, and a bottom surface, and a lower plate having at least two lower apertures therethrough, a top surface, and a bottom surface. Each lower aperture corresponds to one of the upper apertures of the upper plate.

When the upper and lower plates are mutually aligned, the at least one eyepiece may be inserted through corresponding upper and lower apertures. Furthermore, when a plate is selectively slid with respect to the other plate, the upper and lower apertures become misaligned to bind the eyepieces to retain each eyepiece in the holder.

A variety of configurations may be used with the described eyepiece holder. For example, the upper and lower plates may be slidably mutually fixed with a tongue-in-groove arrangement, and the upper and lower plates may be mutually slidably fixed with a pair of L-shaped brackets, which may provide additional stability. Also, each plate may include a plurality of apertures of varying sizes to accommodate eyepieces of different sizes. Also, to provide protection from scratching due to contact with an exterior surface, and to provide friction in order to prevent an eyepiece from slipping out of the holder when locked, each lower aperture may include an elastic element therearound for protecting each eyepiece in an exemplary embodiment.

Furthermore, the shifting of the plates may be actuated by a variety of mechanisms. In an exemplary embodiment, the upper plate may include a flange at one side extending down over a corresponding side of the lower plate. A lock mechanism may be fixed in the exemplary embodiment between the flange and the corresponding side of the lower plate to selectively provide for shifting of the lower plate with respect to the upper plate by actuation of the lock mechanism. In a further embodiment, a lever pivotally fixed to the upper plate and slidably fixed to the lower plate may be included, such that actuating the lever shifts the lower plate with respect to the upper plate. Also, in an exemplary embodiment, the lower plate may be biased with respect to the upper plate against mutual alignment of the upper and lower apertures. The eyepieces may then be retained in the holder unless the lower plate is manually shifted against its bias such that the upper and lower apertures become aligned.

The claimed eyepiece holder may be used to lock multiple eyepieces as a group, instead of requiring that each eyepiece be locked individually. The eyepiece holder may furthermore be used with eyepieces with ends having different widths, and permitting the eyepieces to be picked while unlocked in the eyepiece holder. The eyepiece holder also may provide protection to the eyepieces from contact with external surfaces by providing, for example, padded apertures on the lower plate. Other features and advantages of the present invention will become apparent from the following more detailed description, taken in conjunction with the accompanying drawings, which illustrate, by way of example, the principles of the invention.

DESCRIPTION OF THE DRAWINGS

FIG. 3 is a perspective view of the bottom and side of an exemplary embodiment of a lockable eyepiece holder;

FIG. 4 is a cross-section view of an exemplary embodiment of a lockable eyepiece holder, taken generally along lines 4-4 of FIG. 3;

FIG. 5 is a perspective view of an exemplary embodiment of a lock mechanism for use with a lockable eyepiece holder.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. Any use of the word "means" herein is intended to invoke means-plus-function limitation in accordance with 35 U.S.C. §112, sixth paragraph, even if the word "means" follows words describing the function.

Figure 1:
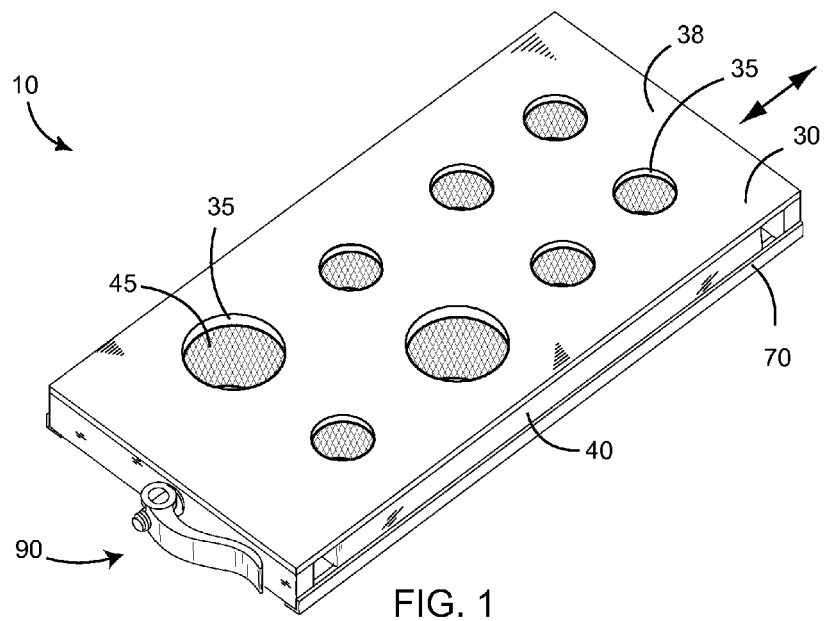
FIG. 1 is a perspective view of the top and side of an exemplary embodiment of a lockable eyepiece holder.

FIG. 1 is a perspective view of the top and side of an exemplary embodiment of a holder 10 of at least one eyepiece 20 with a lock mechanism 90. The holder 10 includes an upper plate 30 having at least two upper apertures 35 therethrough, a top surface 38, and a bottom surface 32 (FIG. 3). While the upper plate 30 shown in FIG. 1 is rectangular in shape, any suitable shape may be used, including square, circular, ovoid, and trapezoidal plates, for example. The holder 10 also includes a lower plate 40 having at least two lower apertures 45 therethrough, a top surface 48, and a bottom surface 42. As with the upper plate 30, the lower plate 40 may have any suitable shape, and may have a shape that matches the upper plate 30 or that differs from the upper plate 30 depending on the user's preferences. While the top and bottom surfaces 38,32,48,42 of the upper plate 30 and the lower plate 40, respectively, are shown to be substantially flat in FIG. 1, the top and bottom surfaces 38,32,48,42 may be curved (e.g., to increase portability of the holder 10) and/or ridged (e.g., to provide shock absorption in the event that the holder 10 is dropped).

As stated above, the upper plate 30 includes upper apertures 35, and the lower plate 30 includes lower apertures 45. Each lower aperture 45 corresponds to one of the upper apertures 35 of the upper plate 30, thereby allowing eyepieces 20 to be placed through an upper aperture 35 and its corresponding lower aperture 45 when the upper apertures 35 and lower apertures 45 are aligned. Each plate may include a plurality of apertures 35 and 45 of varying sizes, to accommodate eyepieces 20 of different sizes in an exemplary embodiment. For example, in a holder 10 used for telescope eyepieces 20, upper apertures 35 and lower apertures 45 may be designed to accommodate eyepieces 20 with diameters of 1¼ inches and 2 inches. The upper and lower apertures 35 and 45 match the diameters of the eyepieces 20 held therein with substantially the same tolerance.

The lower plate 40 may be selectively slidably fixed in one direction, that is, one dimension, with respect to the upper plate 30. By being selectively slidably fixed, the lower plate 40 and upper plate 30 may be slid with respect to one another, and may be fixed in a position that is selected by the user. In the exemplary embodiment shown in FIG. 1, the lower plate 40 is slidable in the direction indicated by the arrow. While in the exemplary embodiments shown in FIGS. 1-3 and 6 utilize a fixed upper plate 30 and sliding lower plate 40, configurations where either the upper plate 30 or the lower plate 40 slide, or both plates slide, may also be used.

In an exemplary embodiment, the holder 10 may use a lock mechanism 90 to maintain the holder 10 in a fixed position, to prevent further sliding of the upper and/or lower plates 30,40. The lock mechanism 90 may maintain the position of the upper plate 30 and the lower plate 40 using any suitable structure. For example, a lock mechanism 90 may be used to lock the respective positions of the upper plate 30 and the lower plate 40. The lock mechanism 90 is described in further detail below. The upper plate 30 and lower plate 40 may be mutually slidably fixed with a pair of L-shaped brackets 70 in an exemplary embodiment. Such an embodiment may be advantageous because the brackets 70 may provide additional support for the upper plate 30 and the lower plate 40.

While the lock mechanism 90 shown in FIG. 1 is a cam clamp mechanism, other lock mechanisms may be used. For example, a ratchet mechanism (not shown), wherein sliding is permitted in one direction and resisted in the other unless a release mechanism is triggered, may be used as the lock mechanism 90.

Figure 2:
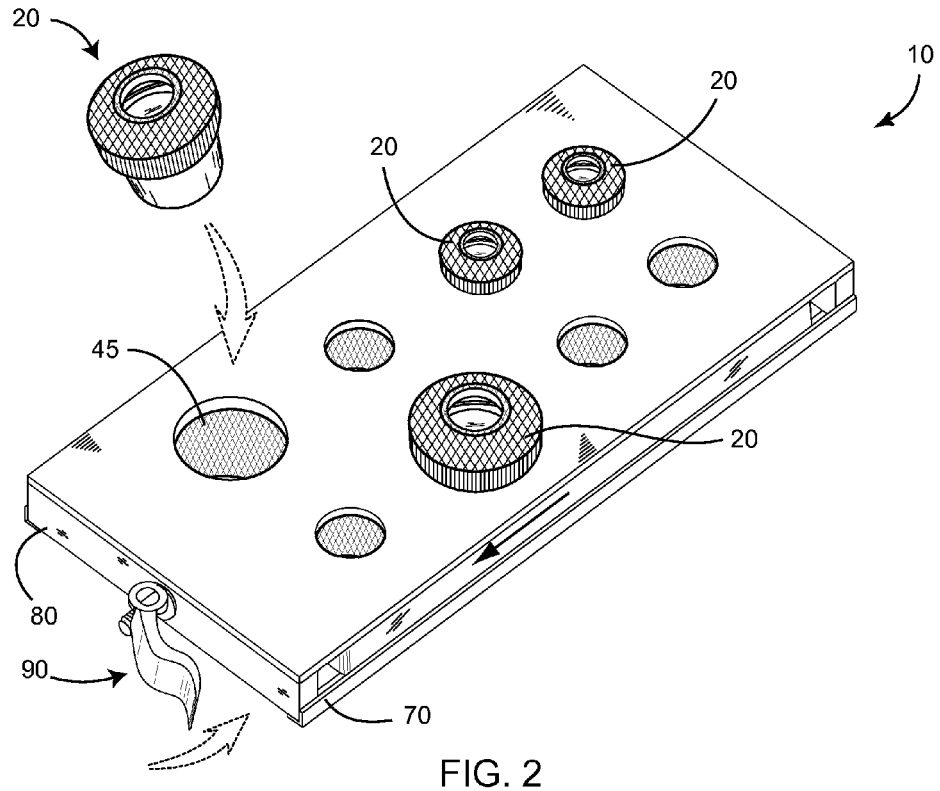
FIG. 2 is a perspective view of the top and side of an exemplary embodiment of a lockable eyepiece holder with eyepieces.

FIG. 2 is a perspective view of the top and side of an exemplary embodiment of a holder 10 of at least one eyepiece 20 with a lock mechanism holding eyepieces 20. An eyepiece 20 may be any lens used with an optical device (e.g., telescopes, microscopes, and binoculars) for magnification that is closest to the eye of the user when used. The upper apertures 35 and corresponding lower apertures 45 are mutually aligned in FIG. 2, meaning that objects may be inserted through both the upper apertures 35 and lower apertures 45 substantially freely. When the upper plate 30 and lower plate 40 are mutually aligned, the at least one optical eyepiece 20 may be inserted through upper apertures 35 and the corresponding lower apertures 45. When the lower plate 40 is selectively slid with respect to the upper plate 30, the upper and lower apertures 35 and 45 become misaligned to bind the at least one optical eyepiece 20 to retain the eyepiece 20 in the holder 10.

When the upper and lower apertures 35 and 45 are misaligned, the eyepieces 20 are substantially held in place. Since the upper and lower apertures 35 and 45 match the diameters of the eyepieces 20 held therein with substantially the same tolerance, all of the eyepieces 20 are retained at substantially the same time when the upper apertures 35 and 45 become misaligned, instead of individually. Though some eyepieces 20 may be held more firmly than others, enough friction force is applied to all of the eyepieces 20 to hold the eyepieces 20 substantially in place without damaging the eyepieces 20 due to the elastic element 110. The claimed eyepiece holder 10 may thereby be used to secure multiple eyepieces as a group, instead of requiring that each eyepiece 20 be secured individually.

The upper plate 30 may include a flange 80 at one side extending down over a corresponding side of the lower plate 40. The flange 80 may be advantageous because it may prevent the lower plate 40 from sliding too far from the upper plate 30, and may also be used as part of a locking mechanism for the holder 10. FIG. 3 is a perspective view of the bottom and side of an exemplary embodiment of a holder 10 of at least one eyepiece 20 with a lock mechanism 90. The lock mechanism 90 may be fixed in the exemplary embodiment between the flange 80 and the corresponding side 41 of the lower plate 40 to selectively provide for shifting of the lower plate 40 with respect to the upper plate 30 by actuation of the lock mechanism 90. In the embodiment shown in FIGS. 2 and 3, the lock mechanism 90 may be actuated by rotating the handle of the lock mechanism 90.

Shown in FIG. 3 are the bottom surface 32 of the upper plate 30 and the bottom surface 42 of the bottom plate 40, with lower apertures 45 therethrough. Also, to provide additional protection, each lower aperture 45 may include an elastic element 110 therearound for protecting each eyepiece 20 in an exemplary embodiment. The elastic element 110 may absorb shock and substantially prevent force applied to the holder 10 from impacting or damage any eyepieces 20 held in place by the holder 10, and may be made of an elastomeric material, e.g. rubber or a plastic gel. The elastic element 110 also helps accommodate for slight differences in body diameter for different eyepieces 20, which may be caused by indentations such as undercut grooves, by assisting in holding the eyepieces 20 in place.

FIG. 4 is a cross-section view of an exemplary embodiment of a holder 10 of at least one eyepiece 20 with a lock mechanism 90. The upper plate 30 having the top surface 38 and a bottom surface 32 may contact the top surface 48 of the lower plate 40 in the exemplary embodiment.

The shifting of the plates may be actuated by a variety of mechanisms. FIG. 5 is a perspective view of an exemplary embodiment of a lock mechanism 90 for use with a holder 10 of at least one eyepiece 20. The lock mechanism 90 may include a lever 100 pivotally fixed to the upper plate 30 and slidably fixed to the lower plate 40. By being pivotally fixed to the upper plate 30, the lever 100 may be rotated with respect to the upper plate 30. By being slidably fixed to the lower plate 40, the lever 100 may slide with respect to the lower plate 30. In the exemplary embodiment, actuating the lever 100 may shift the lower plate 40 with respect to the upper plate 30.

In an exemplary embodiment, the lower plate 40 may be biased with respect to the upper plate 30 into mutual alignment of the upper apertures 35 and lower apertures 45. A biasing means 120, such as spring 120 (FIG. 5), may be used to provide the return shift of the lower plate 40 for mutual alignment, for example. Alternately, the spring 120 may be arranged to urge the lower plate 40 away from mutual alignment with the upper plate 30, if desired. The eyepieces 20 may then be retained in the holder 10 unless the lower plate 40 is manually released by the lock mechanism 90 such that the upper apertures 35 and lower apertures 45 become aligned.

Figure 6:
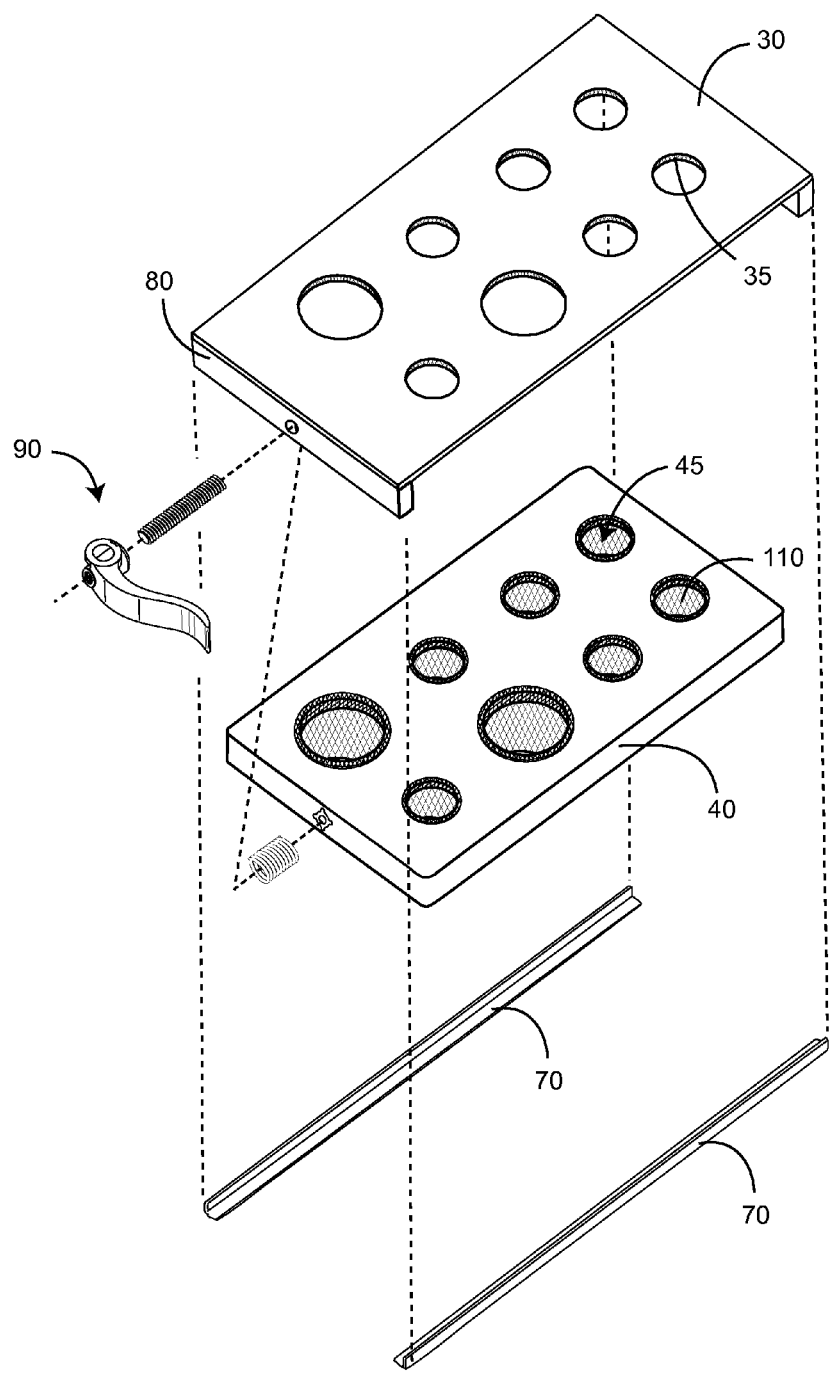
FIG. 6 is an exploded view of an exemplary embodiment of a lockable eyepiece holder.

FIG. 6 is an exploded view of an exemplary embodiment of a holder 10 of at least one eyepiece 20 with a lock mechanism 90. The lock mechanism 90 and the spring 120 together may be used as a lock mechanism 90 to fix the position of the upper plate 30 and lower plate 40 with respect to one another. Upper apertures 35 may be aligned with the lower apertures 45, which may include a elastic element 110 to protect the eyepieces 20 and provide friction to the eyepieces 20.

While a particular form of the invention has been illustrated and described, it will be apparent that various modifications can be made without departing from the spirit and scope of the invention. For example, a wing nut or similar fastening device may be used as a lock mechanism 90, instead of the lock mechanism 90 shown in FIGS. 1-3 and 6, or a locking spacer may be used as a locking mechanism instead of a screw-based lock mechanism 90. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A holder for at least one eyepiece, comprising:
   an upper plate having at least two upper apertures therethrough, a top surface, and a bottom surface;
   a lower plate having at least two lower apertures therethrough, a top surface, and a bottom surface, each lower aperture corresponding to one of the upper apertures of the upper plate, where one of the plates is selectively slidably fixed in one dimension with respect to the other plate;
   a lock mechanism for locking the relative position of each plate;
   whereby when the upper and lower plates are mutually aligned, the at least one eyepiece may be inserted through corresponding upper and lower apertures, and when one of the plates is selectively slid with respect to the other plate, the upper and lower apertures become misaligned to bind the at least one eyepiece in a secured position to retain the eyepiece in the holder, the lock mechanism locking the relative positions of each plate in the secured position.

2. The holder of claim 1 wherein the upper and lower plates are mutually slidably fixed with a pair of L-shaped brackets.

3. The holder of claim 1 wherein the upper plate includes a flange at one side extending down over a corresponding side of the lower plate, the lock mechanism being fixed between the flange and the corresponding side of the lower plate to selectively provide for shifting of the lower plate with respect to the upper plate by actuation of the lock mechanism.

4. The holder of claim 1 further including a lever pivotally fixed to the upper plate and slidably fixed to the lower plate, such that actuating the lever shifts the lower plate with respect to the upper plate, the lever acting as the lock mechanism.

5. The holder of claim 1 wherein the lower plate is biased with a biasing means with respect to the upper plate against mutual alignment of the upper and lower apertures, whereby the eyepieces are retained in the holder unless the lower plate is manually shifted against its bias such that the upper and lower apertures become aligned.

6. The holder of claim 1 wherein each lower aperture includes a high-friction elastic element therearound for protecting and securing each eyepiece.

7. The holder of claim 1 wherein each plate includes a plurality of apertures of varying sizes.

* * * * *